United States Patent [19]

Baloche

[11] Patent Number: 5,664,838
[45] Date of Patent: Sep. 9, 1997

[54] VEHICLE SEAT INCLUDING A PIVOTING BACKREST MOUNTED BY MEANS OF A DEVICE CAPABLE OF WITHSTANDING HIGH TORQUES

[75] Inventor: Francois Baloche, Flers, France

[73] Assignee: Bertrand Faure Equipements SA, France

[21] Appl. No.: 621,586

[22] Filed: Mar. 26, 1996

[30] Foreign Application Priority Data

Mar. 30, 1995 [FR] France ................... 95 03775

[51] Int. Cl.⁶ ........................................ B60N 2/02
[52] U.S. Cl. ...................... 297/378.12; 297/361.1; 297/340
[58] Field of Search .............. 297/378.12, 378.1, 297/361.1, 468, 483, 340, 452.18, 216.1, 216.13, 216.14, 362.11, 376, 316

[56] References Cited

U.S. PATENT DOCUMENTS

| | | |
|---|---|---|
| 4,131,316 | 12/1978 | Pallant et al. |
| 4,394,047 | 7/1983 | Brunelle .................. 297/376 X |
| 4,484,779 | 11/1984 | Suzuki .................. 297/378.12 X |
| 5,000,283 | 3/1991 | Krieg .................. 297/378.12 X |
| 5,205,609 | 4/1993 | Notta et al. .................. 297/378.12 X |
| 5,358,308 | 10/1994 | Judic et al. .................. 297/340 X |
| 5,454,624 | 10/1995 | Anglade et al. .................. 297/378.12 X |

FOREIGN PATENT DOCUMENTS

| | | |
|---|---|---|
| 0 029 997 | 6/1981 | European Pat. Off. . |
| 0 373 081 | 6/1990 | European Pat. Off. . |

*Primary Examiner*—Milton Nelson, Jr.
*Attorney, Agent, or Firm*—Larson and Taylor

[57] ABSTRACT

A vehicle seat in which the backrest is controlled in terms of rotation about an axis of pivoting by an adjustment mechanism which includes an input shaft, a fixed flange integral with the framework of the seat cushion, and a mobile flange which can rotate about an axis parallel to the axis of pivoting of the backrest but offset therefrom. The mobile flange is integral with a pin which penetrates an oblong slot in the framework of the backrest so as to be able to rotate inside this slot and so as to be able to slide radially with respect to the axis of pivoting of the backrest. This pin is further from the axis of pivoting of the backrest than from the axis of rotation of the mobile flange, so that the adjustment mechanism can withstand low torques.

11 Claims, 7 Drawing Sheets

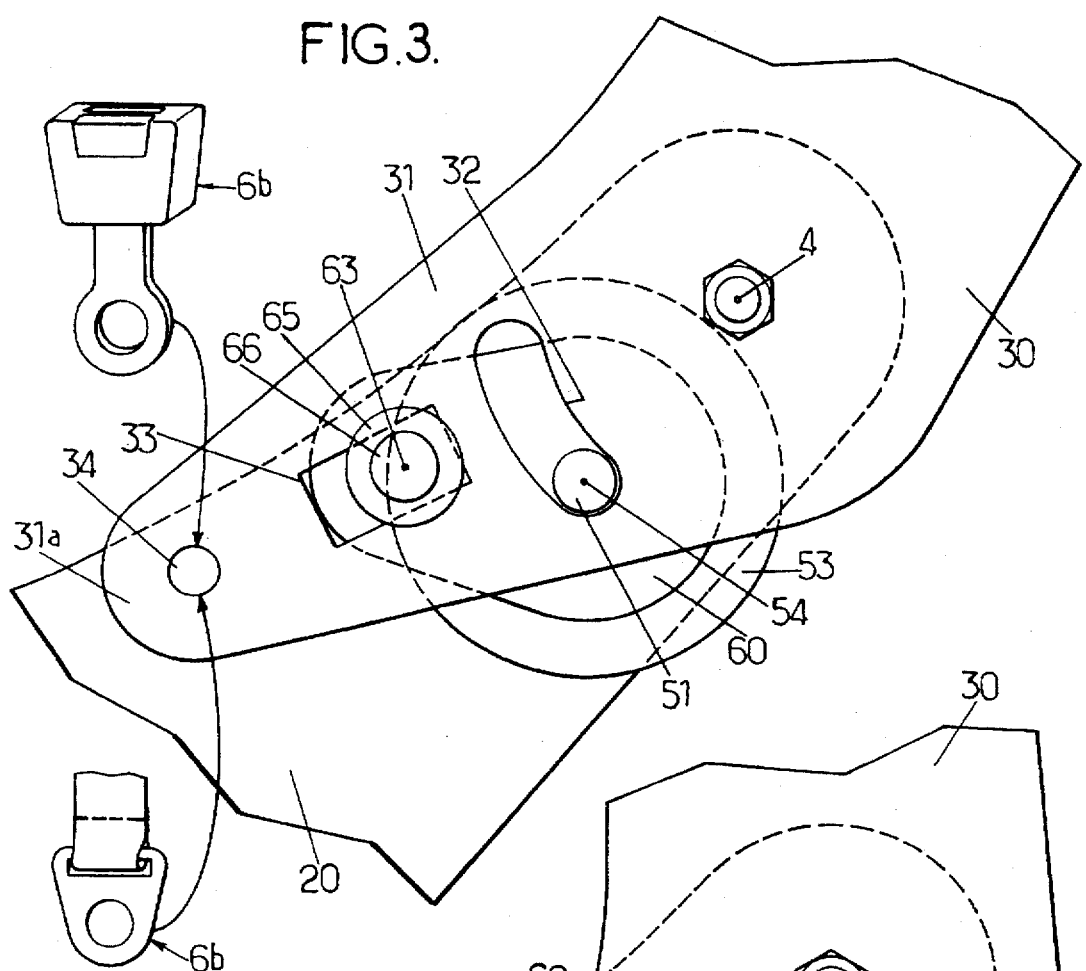
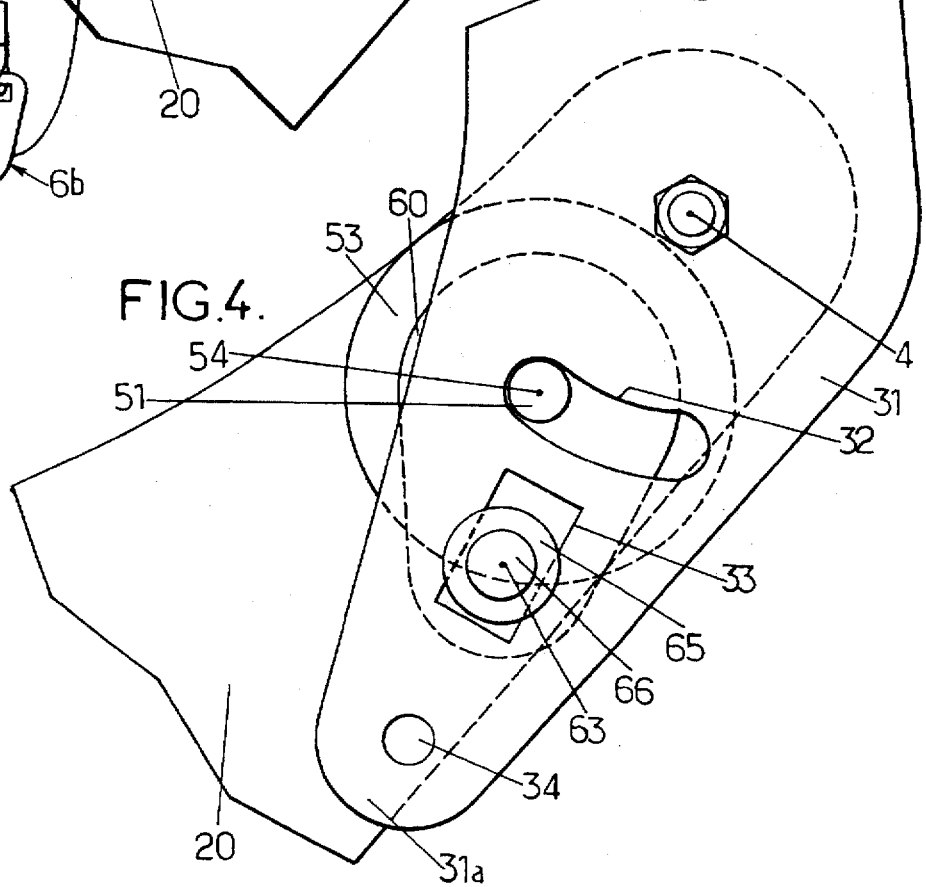

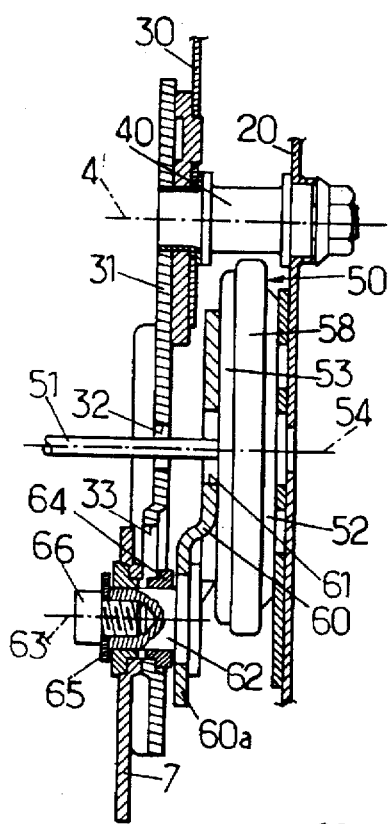
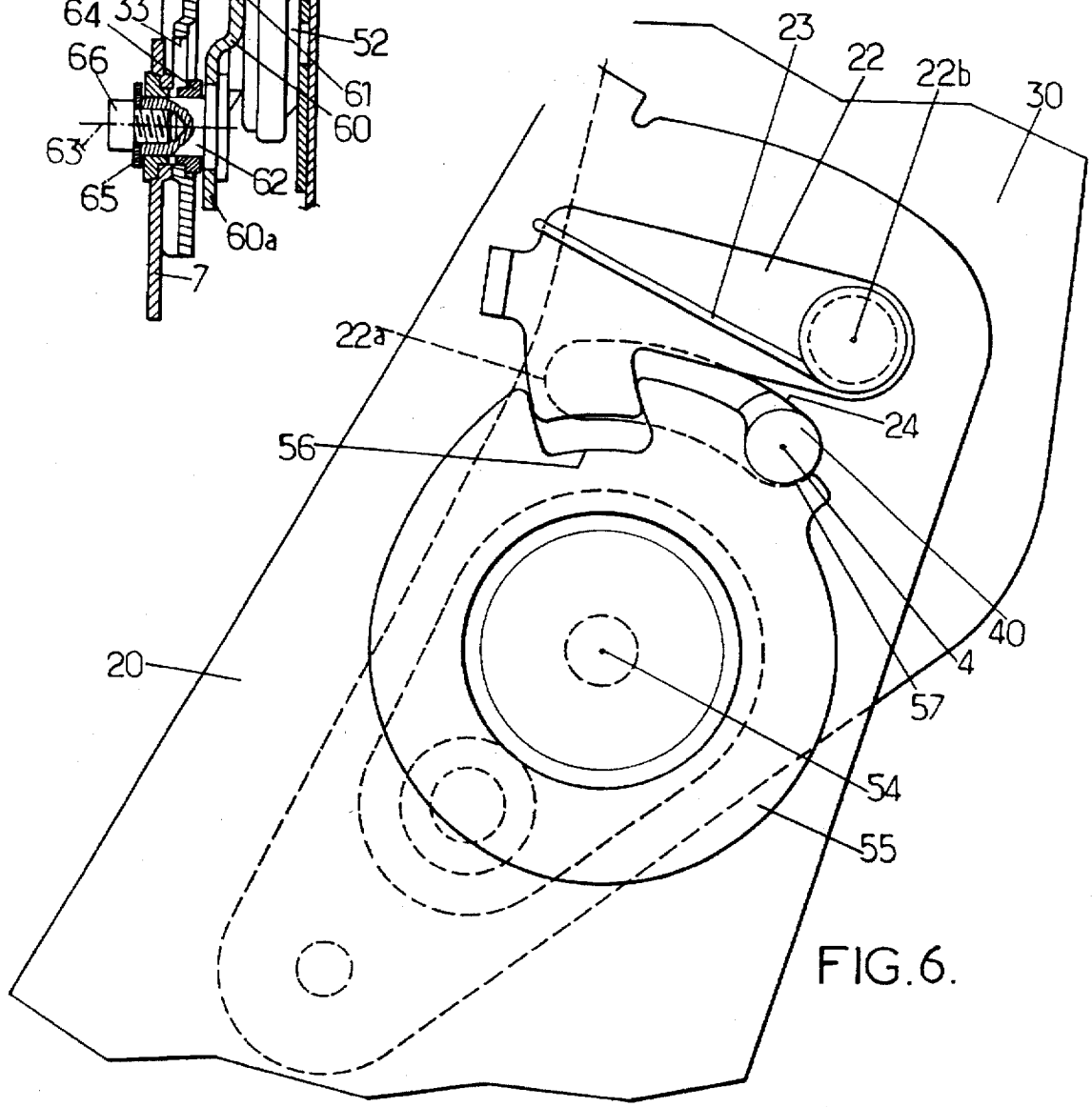

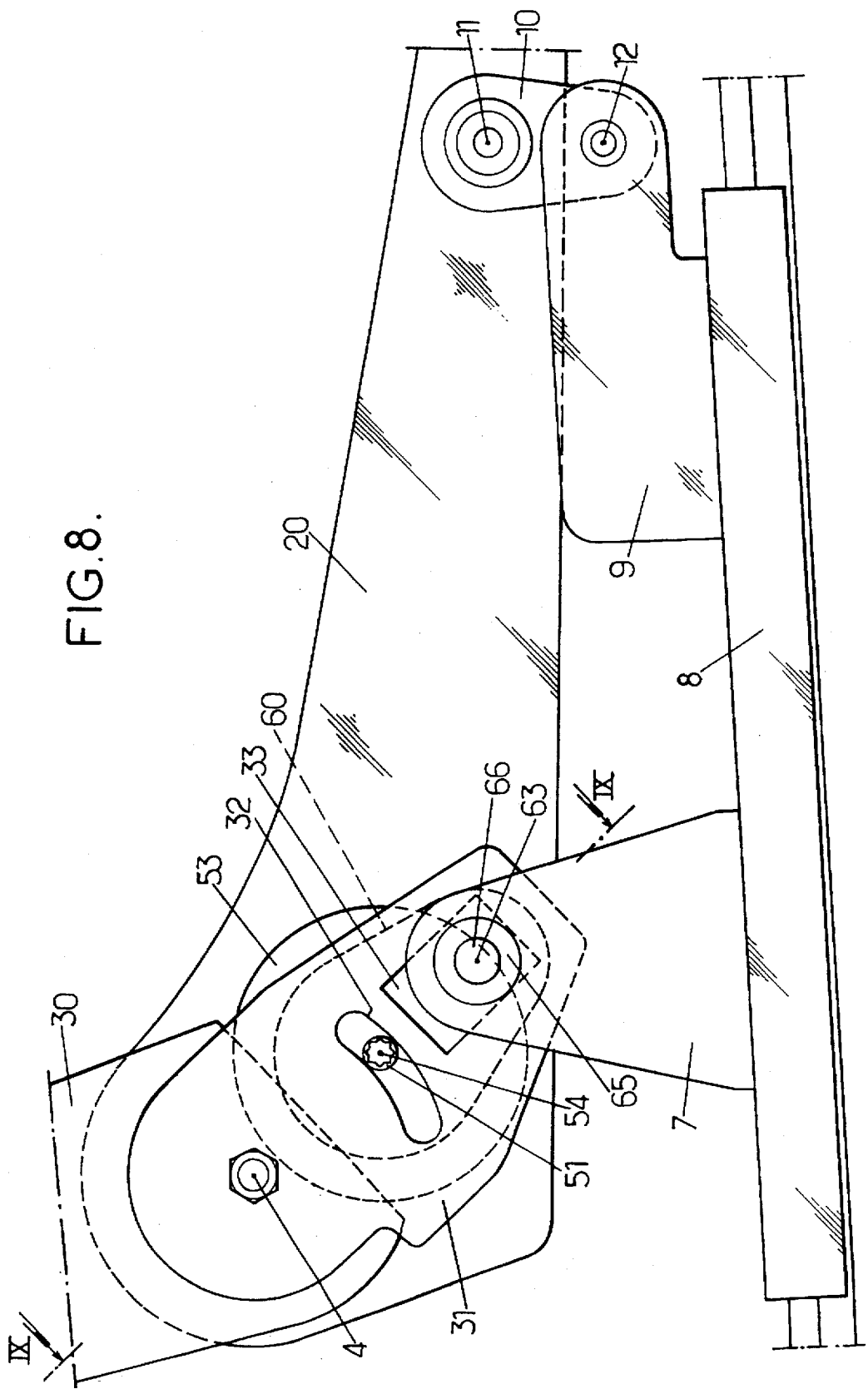

5,664,838

VEHICLE SEAT INCLUDING A PIVOTING BACKREST MOUNTED BY MEANS OF A DEVICE CAPABLE OF WITHSTANDING HIGH TORQUES

FIELD OF THE INVENTION

The present invention relates to vehicle, especially car seats, and more specifically to those which include a seat cushion and a backrest each equipped with a rigid framework, the backrest being mounted so that it can pivot with respect to the seat cushion about a horizontal axis of pivoting, the pivoting of the backrest being controlled by an adjustment mechanism which includes a rotary input member, a support member fixed to one of the two frameworks, termed first framework, and a rotary output member driving the other of the two frameworks, termed second framework, this output member having an axis of rotation parallel to the axis of pivoting of the backrest.

BACKGROUND OF THE INVENTION

The output member of the adjustment mechanism is usually fixed directly to the second framework and its axis of rotation is also the axis of pivoting of the backrest.

Because of this, when the backrest of the seat suffers a substantial impact, especially in the event of an accident, the adjustment mechanism may have to withstand extremely high torques and this is especially although not exclusively the case if the seatbelt of this seat is "on board", that is to say if the upper fixing point of this belt is linked to the backrest of the seat.

As a result, in vehicle seats of the prior art, either conventional adjustment mechanisms are used, in which case there may be risks of these mechanisms breaking in the event of an accident, or use is made of adjustment mechanisms which are specially reinforced to withstand high torques, and which have the drawback of being heavier and more expensive than conventional mechanisms.

OBJECT AND BRIEF SUMMARY OF THE INVENTION

The object of the present invention is especially to alleviate these drawbacks.

To this end, according to the invention, a vehicle seat of the sort in question is essentially characterized in that the axis of rotation of the output member of the adjustment mechanism is offset with respect to the axis of pivoting of the backrest, the output member driving the second framework via a linkage member which is mounted so that it can slide at least radially with respect to an axis chosen from the axis of pivoting of the backrest and the axis of rotation of the output member, that is to say with a sliding motion which varies the radial distance between the linkage member and one of these two axes, the linkage member possibly being able to shift slantwise with respect to a given radial direction, the linkage member furthermore being mounted so that it can pivot about an axis parallel to the axis of pivoting of the backrest, the pivoting of the linkage member taking place with respect to either the output member or the second framework, the axis of pivoting of the linkage member being separated from the axis of rotation of the output member by a first distance, and the axis of pivoting of the linkage member being separated from the axis of pivoting of the backrest by a second distance which is greater than the first distance.

Thus, when the backrest of the seat is subjected to a pivoting torque, this torque is transmitted to the adjustment mechanism with an attenuated value.

By virtue of this provision, it is possible to use an adjustment mechanism which is not specially reinforced, without this resulting in any risk of this mechanism breaking.

In preferred embodiments of the invention, recourse is furthermore had to one and/or other of the following provisions:

- the second distance is between 1.5 and 2.5 times the first distance;
- the two frameworks respectively comprise two mutually parallel flanges between which the adjustment mechanism is arranged, the flange of the second framework having an opening through which the input member of the adjustment mechanism passes with enough clearance to prevent any interference between said input shaft and the flange of the second framework during relative pivoting of the two frameworks;
- the linkage member includes a pin which extends along the axis of pivoting of the linkage member and which is integral with the output member of the adjustment mechanism, the second framework including a slot which is arranged longitudinally and radially with respect to the axis of pivoting of the backrest and which receives the pin, it being possible for this pin to slide along said slot and also to rotate in this slot;
- the seat further includes a seatbelt which has at least one upper linkage point at the top of the backrest: the provisions of the invention are especially useful in this case, because the seatbelt applies a particularly high pivoting torque to the backrest when the vehicle suffers a frontal impact;
- the seatbelt further includes two lower anchoring points, the framework of the backrest having, at least on one side of the seat, an appendage which extends substantially downward and substantially in the extension of the backrest beyond the axis of pivoting of the backrest, at least one of the lower anchoring points of the belt being integral with this appendage: thus, when the vehicle suffers a frontal impact, the seatbelt applies to the backrest, via its lower anchoring point, a pivoting torque in the opposite direction to the pivoting torque applied to the backrest by the upper linkage point, and this tends further to reduce the net value of the pivoting torque applied to the adjustment mechanism; although this provision is particularly advantageous and preferred in combination with the provisions already mentioned hereinabove, it could possibly be used by itself;
- the support member of the control mechanism is mounted so that it can rotate about an axis termed axis of tipping parallel to the axis of pivoting of the backrest, the axis of pivoting of the backrest being embodied by a pivot which is integral with the support member of the adjustment mechanism at least as far as rotation about the axis of tipping is concerned, it being possible for the support member of the adjustment mechanism to be immobilized in terms of rotation about the axis of tipping by means of a locking bolt, in a predetermined angular position which corresponds to the backrest being in an up position, it being possible to actuate this locking bolt to unblock the rotation of the support member about the axis of tipping, thus allowing the backrest of the seat to be tipped forward; by virtue of this provision, the invention can be implemented especially for the front seat of a motor vehicle which has no door for access to the rear bench seat;
- the pivot is integral with the second framework and has a pin of circular cross section which extends toward the first framework, the first framework having a slot which has the shape of an arc of a circle centered on the axis of tipping and which receives said pin, and the support member of the adjustment mechanism being integral with a rigid plate substantially perpendicular to the axis of tipping, this plate having a peripheral edge which has a first notch interacting with the locking bolt to immobilize the support member of the adjustment mechanism, and a second notch which receives the pin of the axis of pivoting of the backrest in order to drive this pin in rotation about the axis of tipping;

the framework of the seat cushion is supported by a support device independent of the adjustment mechanism and of the linkage member;

the linkage member is mounted so that it can pivot about its aforementioned axis of rotation with respect to a first support, the framework of the seat cushion being supported toward the rear at least by this first support and furthermore being supported toward the front at least by a second support with respect to which it can pivot about at least one axis parallel to the axis of pivoting of the backrest, actuation of the adjustment mechanism leading simultaneously to a pivoting of the backrest of the seat and to a vertical displacement of a real part of the seat cushion;

the way in which the linkage member is mounted on the first support and the way in which the framework of the seat cushion is mounted on the second support allows the linkage member and the axis of pivoting of the framework of the seat cushion with respect to the second support to move closer together or further apart.

BRIEF DESCRIPTION OF THE DRAWINGS

Other features and advantages of the invention will become clear in the course of the following detailed description of several of its embodiments, given by way of non-limiting examples, with reference to the attached drawings.

In the drawings:

FIG. 4 is a view similar to FIG. 3, the seat being inclined forward as far as possible, FIG. 6 is an elevation on VI of FIG. 5, the backrest of the seat being in the normal position of use, FIG. 8, is a side view of the framework of a seat according to another embodiment, termed "lounger", FIG. 9 is a part section on IX—IX of FIG. 8.

DESCRIPTION OF THE PREFERRED EMBODIMENTS

In the various figures the same references denote identical or similar elements.

Figure 1:
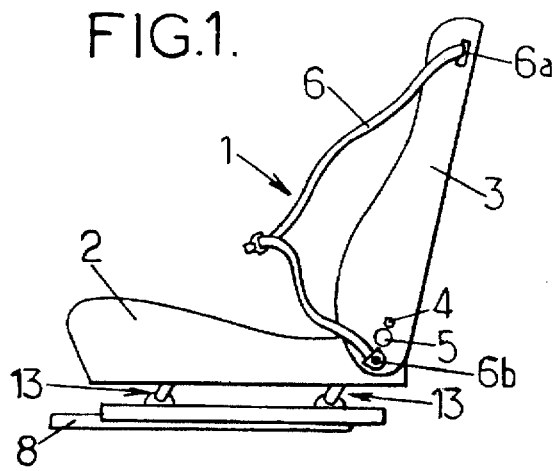
FIG. 1 is a diagrammatic sideview of a seat according to the invention.

As represented in FIG. 1, the invention relates to a vehicle seat 1, intended especially to equip a motor vehicle.

This seat includes:

a seat cushion 2 which is generally mounted so that it can slide fore and aft on slideways 8 via a support device 13 which may, for example, be a raiser mechanism, and a backrest 3 which is mounted so that it can pivot with respect to the seat cushion 2 about a horizontal axis of pivoting 4. The inclination of the backrest is controlled by an adjustment mechanism actuated, for example, by means of a rotary knob 5 or by means of an electric motor.

The invention applies more particularly although not exclusively to the seats of vehicles which have a so-called on-board seatbelt 6, this seatbelt including an upper linkage point 6a at the top of the backrest 3 and two anchoring points 6b linked to the seat cushion 2, or preferably linked to the backrest 3 as will be explained hereinafter.

In general, the upper linkage point 6a is not directly an anchoring point but rather a slot in which the seatbelt 6 slides, which belt is then extended within the backrest 3 as far as a winder (not represented).

Figure 2:
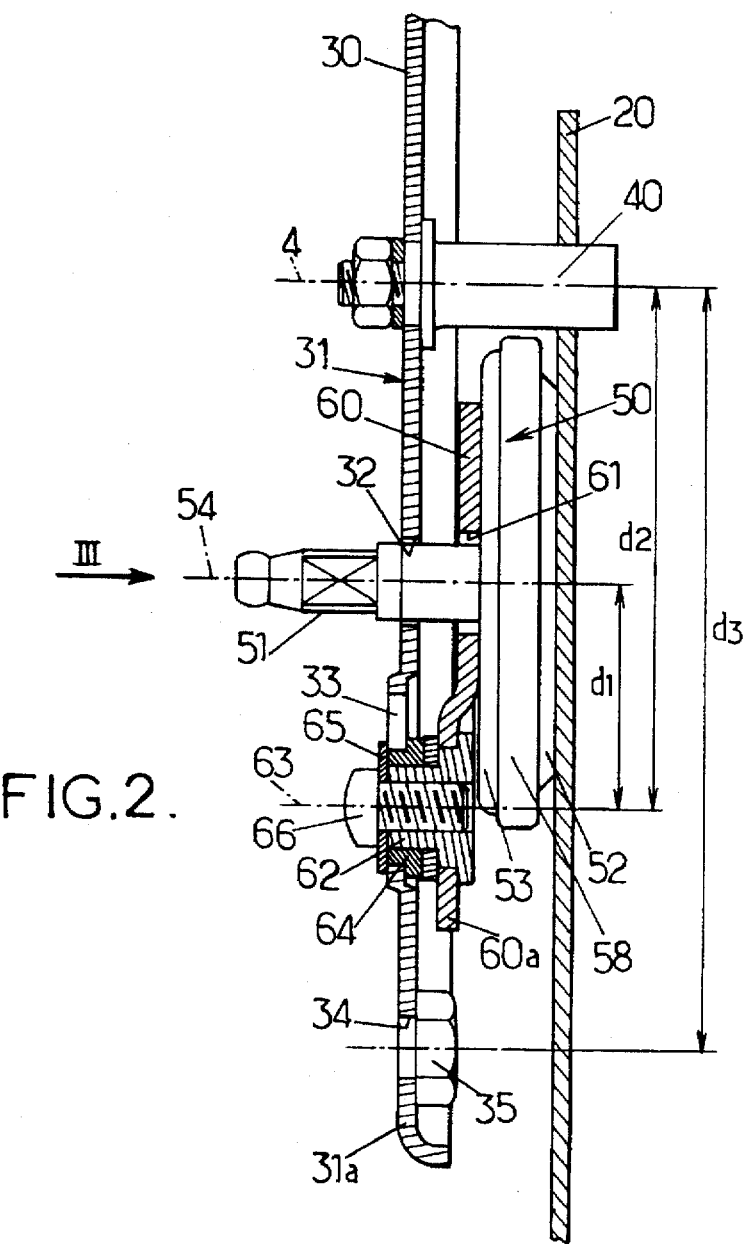
FIG. 2 is a part section of the inclination adjustment device for the seat of FIG. 1, FIG. 3 an elevation on III of FIG. 2, the backrest of the seat being inclined backward as far as possible.

As represented in FIGS. 2 to 4, the axis of pivoting 4 is embodied on each side of the seat by a rigid pivot 40 extending horizontally and linking together two rigid flanges 20 and 30 which extend in parallel vertical planes and which belong respectively to the framework of the seat cushion 2 and to the framework of the backrest 3 of the seat, each flange 20 generally being mounted on the aforementioned support device 13.

The pivoting of the backrest 3 about the axis 4 is controlled by a so-called "continuous" adjustment mechanism 50 which is well known to those skilled in the art.

The adjustment mechanism 50 is placed between the seat cushion flange 20 and an appendage 31 belonging to the backrest flange 30, this appendage 31 extending the backrest flange substantially downward beyond the axis 4. The appendage 31 may be formed as a single piece with the backrest flange 30 or alternatively may be fixed to said backrest flange.

The adjustment mechanism 50 includes:

an input shaft 51 parallel to the axis 4 and to which especially the knob 5 already described or a rotary member driven by a motor may be fixed, a so-called fixed flange 52 which is fixed to the seat cushion flange 20, and a so-called mobile flange 53 which can rotate about an axis 54.

The fixed and mobile flanges 52 and 53 are arranged parallel to the seat cushion flange 20 and to the backrest flange 30.

These flanges 52 and 53, held together by means of a crimped dish 58, form a housing inside which a gear set, especially a hypocycloid gear set is arranged, this gear set allowing the rotation of the mobile flange 53 to be controlled by rotating the control shaft 51. This gear set could, by way of nonlimiting example, be the one disclosed in document EP-A-0 505 229, or any other similar gear set.

In the example represented, the control shaft 51 is centered on the axis of rotation 54 of the mobile flange 53, but this arrangement is not obligatory and it is furthermore possible for the axis of rotation 54 not to be fixed, the axis 54 then for example following a slight circular motion as the adjustment mechanism is actuated.

In the example represented, the control shaft 51 passes through a slit-like slot 32 made in the backrest flange 30 and which has the shape of an arc of a circle centered on the axis of pivoting 4 so as to allow the flange 30 to pivot without interference with the control shaft 51. The ends of the oblong slot 32 determine two end stop positions-corresponding respectively to maximum forward inclination of the backrest and to maximum backward inclination of the backrest.

Moreover, the mobile flange 53 of the adjustment mechanism is connected to the backrest flange 30 via a rigid arm 60 which is fixed rigidly to said mobile flange 53.

In the example represented in the drawings, the arm 60 has the shape of a metal plate which is arranged substantially in a vertical plane and which has a central orifice 61 to allow passage of the control shaft 51.

The arm 60 extends substantially downward and away from the axis of rotation 54, as far as an end 60a which is integral with a pin 62 of circular cross section. This pin extends along an axis 63 parallel to the aforementioned axes 4 and 54, and it passes through a straight oblong slot 33 formed in the backrest flange 30 and which extends radially with respect to the axis of pivoting 4 of the backrest.

In the example represented, a rigid component 64 known as a "gib" is mounted so that it can slide along the oblong slot 33, and this gib is also mounted so that it can rotate on the pin 62 about the axis 63.

Furthermore, in the particular example under consideration here, a washer 65 is fixed by means of a screw 66 to the end of the pin 62 furthest from the arm 60, this washer partially overlapping the backrest flange 30.

When the mechanism 50 is actuated, the arm 60 rotates about the axis 54 and causes the backrest flange 30 to pivot about the axis 4, via the pin 62 and the gib 64.

In the course of in the gib 64 he pin 62 rotates in the gib 64 which slides in the slot 33, and the slot 32 also shifts with respect to the control shaft 51 (see FIGS. 3 and 4).

It will be noted that the gib 64 could possibly be omitted, the pin 62 then preferably having a diameter substantially equal to the width of the oblong slot 33.

Moreover, the pin 62 could be capable of rotation with respect to the arm 60 rather than with respect to the backrest flange 30.

It will also be noted that the pin 62 could extend directly from a portion of the mobile flange 53 distant from the axis 54, the arm 60 then being dispensed with.

Moreover, these provisions could possibly be replaced by a pin extending from the backrest flange 30 toward the arm 60 or the mobile flange 53, it being possible for this pin to rotate about its longitudinal axis with respect to the backrest flange 30 or with respect to the arm 60 or with respect to the mobile flange 53, with this pin being connected to the arm 60 or to the mobile flange 53 so that it can slide radially with respect to the axis of rotation 54.

In any event, the axis of pivoting 63 of the pin 62, or of any linkage member, is separated from the axis of rotation 54 by a distance d1 which is less than the distance d2 separating the same axis of pivoting 63 from the axis of pivoting 4.

As a result of this, when a high pivoting torque C is imposed on the backrest 3 of the seat, especially in the event of a frontal impact, on the vehicle, the torque to which the adjustment mechanism 50 is subjected has a value C.d1/d2 which is less than the value C.

As a preference, the distance d2 is of the order of twice the distance d1, and more generally d2 is more than 1.5 times the distance d1, d2 preferably being between 1.5 and 2.5 times the distance d1.

As a preference, at least on that side of the seat which has the adjustment mechanism 50 if this mechanism is provided on just one side, provided at the lower end 31a of the appendage 31 of the backrest flange is a fixing orifice 34 associated, for example, with a bolt 35 to allow the fixing of an anchor 6b for one of the lower anchoring points of the seatbelt 6. This fixing orifice is separated from the axis of pivoting 4 of the backrest by a distance d3 which is preferably greater than the distance d2.

This anchor 6b could be either a permanent anchor or an anchor provided with a fastening system to constitute the non-permanent anchoring point of the seatbelt (see FIG. 3).

Advantageously, the two lower anchor 6b of each seatbelt could be fixed to two identical or similar fixing orifices 34 provided on either side of the backrest of the seat.

By virtue of this arrangement, if the vehicle suffers a frontal impact, the lower anchoring points 6b of the seatbelt transmit to the backrest flange 30 a torque about the axis of pivoting 4 which is in the opposite direction to the torque transmitted by the upper linkage point 6a of the seatbelt, and this contributes further to reducing the net value of the torque to which the adjustment mechanism 50 is subjected.

Figure 5:
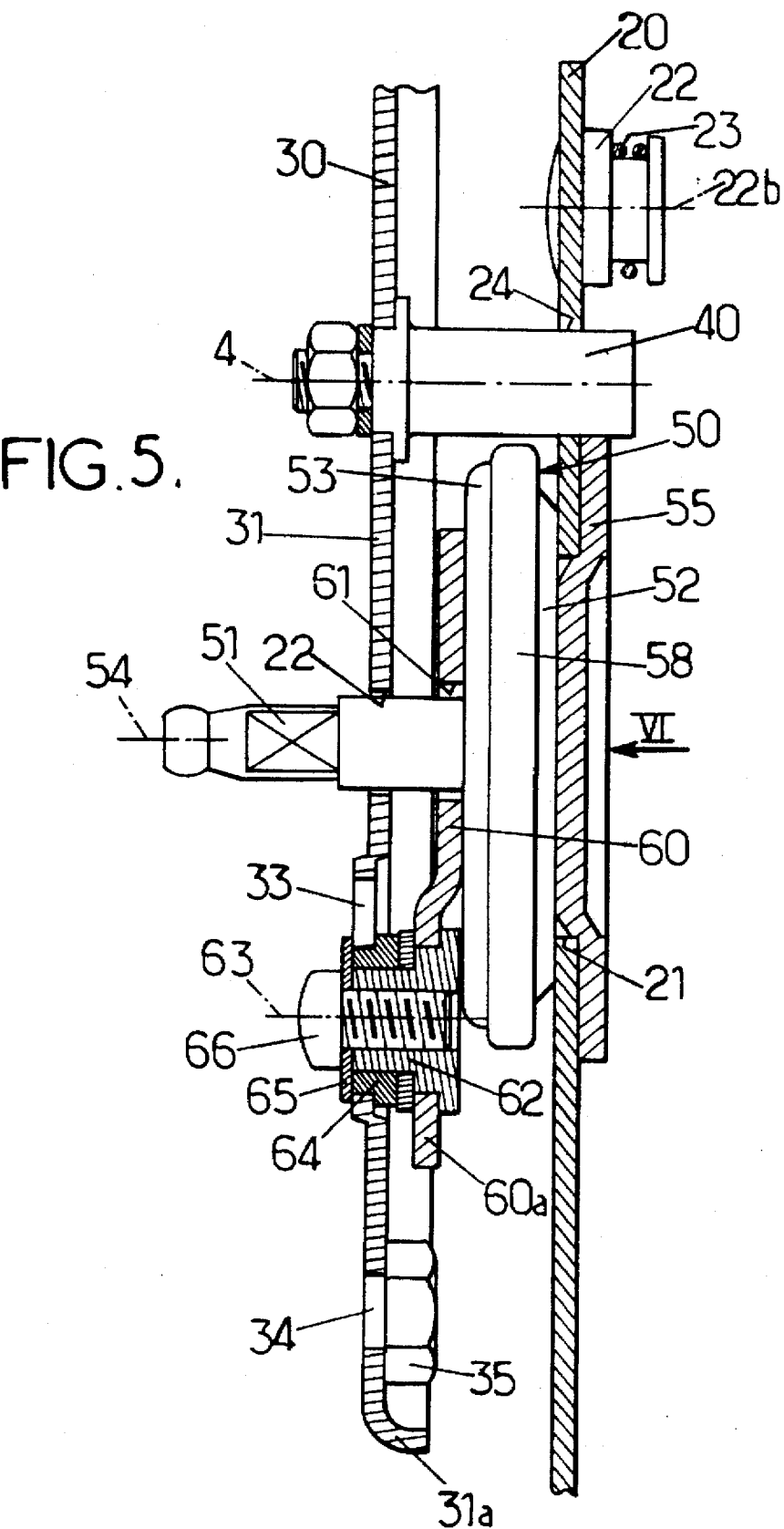
FIG. 5 is a part section of a device similar to that of FIG. 2, for another embodiment of the invention allowing the backrest to be tipped fully forward.
Figure 7:
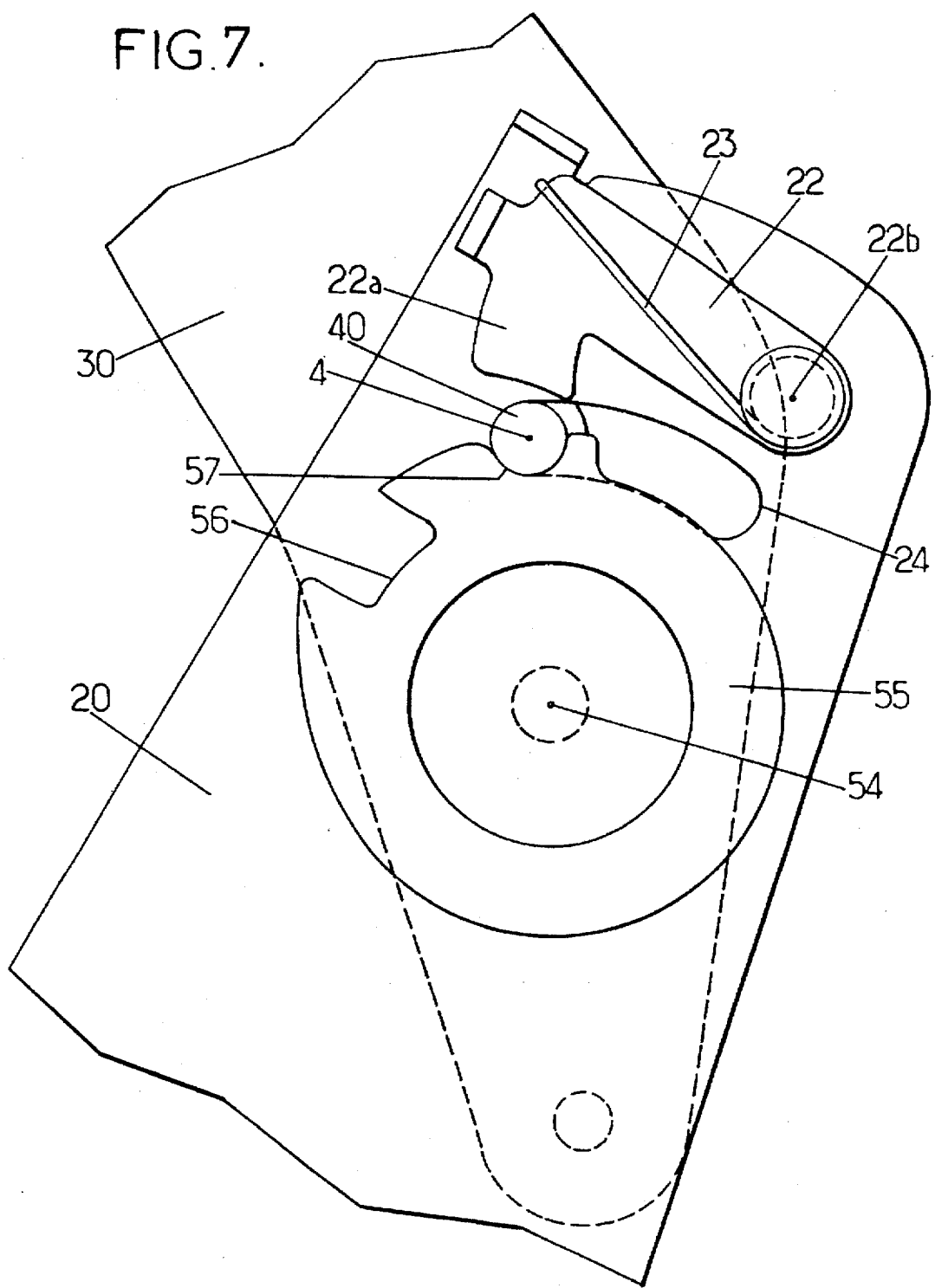
FIG. 7 is a view similar to FIG. 6 when the backrest of the seat is tipped forward.

The device represented in FIGS. 5 to 7 is similar to the one already described with reference to FIGS. 1 to 4, so it will not be described in detail again.

The device of FIGS. 5 to 7 may be distinguished from that of FIGS. 1 to 4 essentially in that the fixed flange 52 is no longer integral with the seat cushion flange 20, but mounted so that it can rotate with respect to the latter about a so-called axis of tipping which is parallel to the axis of pivoting 4 of the backrest. This axis of tipping constitutes the central axis of the control shaft 51, and in the example represented it also constitutes the axis of rotation 54 of the mobile flange 53 of the adjustment mechanism.

In the example represented in the drawings, the seat cushion flange 20 has a circular orifice 21 centered on the axis 54, and in which a substantially disk-shaped rigid plate 55 which pivots about the axis 54 is engaged substantially without radial clearance.

This rigid plate has an outer rim which bears against one face of the seat cushion flange 20 whereas a peripheral portion of the mobile flange 52 bears on the other face of the seat cushion flange 20.

The rigid plate 55 has two notches, 56 and 57 respectively, at its periphery.

The first notch 56 is intended to receive the nose 22a of a hook 22 which is mounted so that it can pivot on the seat cushion flange about an axis 22b parallel to the axis of pivoting 4 of the backrest. This hook is urged by a spring 23 into a position in which its nose 22a engages inside the notch 56, thus preventing any rotation of the rigid plate 55 about the axis of pivoting 54.

The second notch 57 for its part engages over the pivot 40 which has the shape of a pin integral with the backrest flange 30.

The pivot 40 is moreover mounted so that it can slide in an oblong slot 24 formed in the seat cushion flange 20, this slot having the shape of an arc of a circle centered on the axis of tipping 54.

So long as the rigid plate 55 is locked by the hook 22, as represented in FIG. 6, the device which has just been described operates in the same way as the device of FIGS. 1 to 4.

By contrast, when the hook 22 is rotated about its axis 22b, for example by means of a lever handle which can be accessed on the outside of the seat and is connected to the hook 22 via a cable, it is then possible to tip the backrest of the seat forward, making it pivot about the axis of tipping 54, as represented in FIG. 7.

When the backrest of the seat is pivoted backward again, the nose 22a of the hook 22 again engages in the notch 56 when the backrest has returned to its normal position, after which the device again operates like the one described in FIGS. 1 to 4.

In the embodiment represented in FIGS. 8 to 10, the seat inclination adjustment device is again similar to the one already described with reference to FIGS. 1 to 4 and will therefore not be described in detail.

Like in the device of FIGS. 1 to 4, the fixed flange 52 here is integral with the seat cushion flange 20 and the appendage 31 is integral with the backrest flange 30, but this time made in the form of an attached component.

Figure 10:
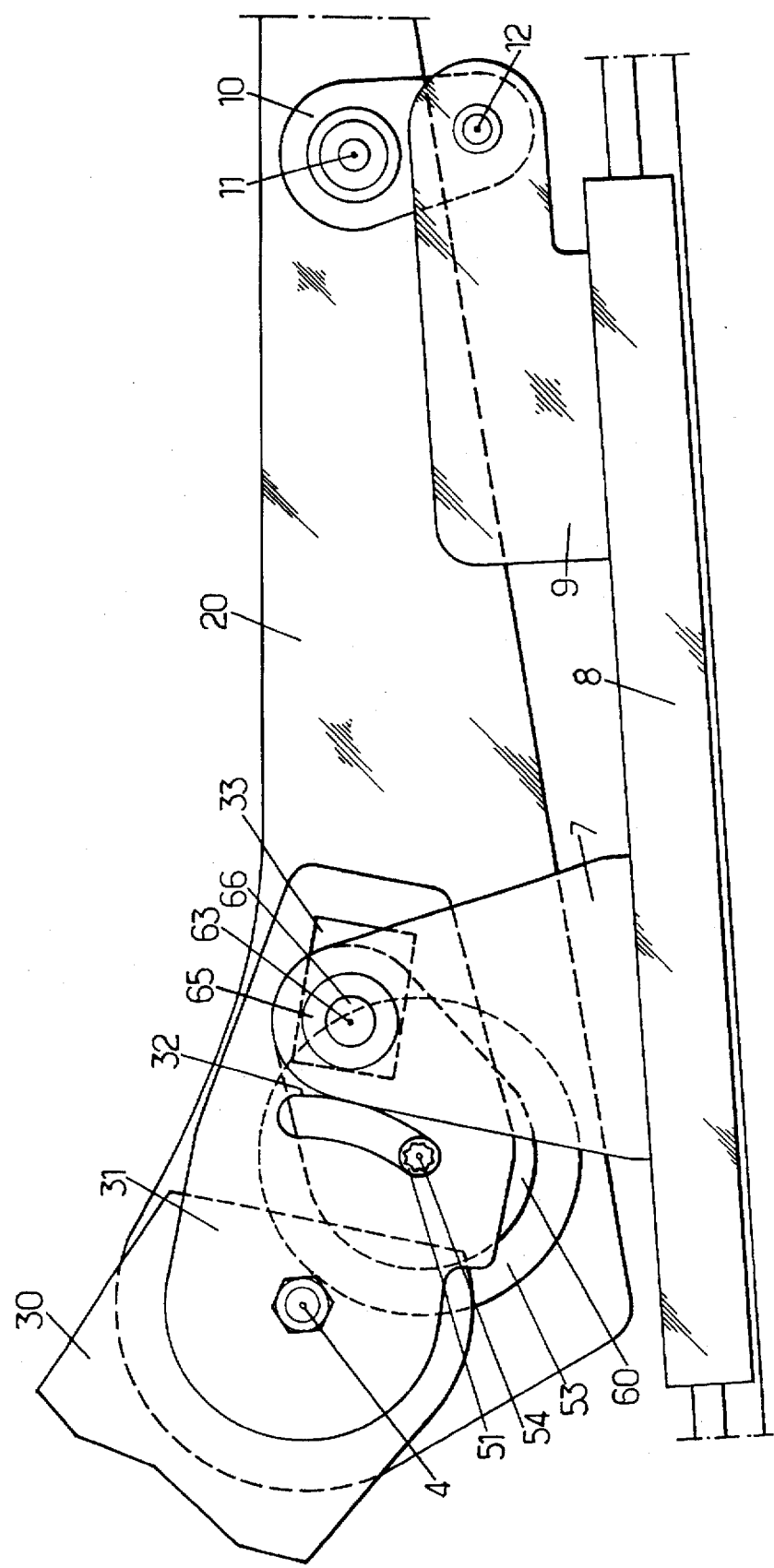
FIG. 10 is a view similar to FIG. 8, when the backrest of the seat is inclined backward as far as possible.

The device of FIGS. 8 to 10 can be distinguished essentially from that of FIGS. 1 to 4 in that the pin 62 is not only mounted so that it can pivot with respect to the gib 64 itself able to slide in the oblong slot 33, but in addition, this pin 62 is mounted so that it can pivot on a support 7 about its axis 63.

Toward the rear of the seat, at least the seat cushion flange 20 situated on that side of the seat which has the adjustment mechanism 5 is supported by this support 7, via the pin 62, the arm 60, and the adjustment mechanism 50. This feature differentiates the embodiment of FIGS. 8 to 10 from the embodiments described hereinabove, in which the seat cushion framework was supported independently of the pin 62 the arm 60 and the adjustment mechanism 50.

The support 7 may be fixed for example to the mobile part 8 of a slideway which allows the longitudinal position of the seat to be adjusted.

Toward the front of the seat cushion of the seat, the seat cushion flange 20 is mounted so that it can pivot on a link rod 10 about an axis 11 parallel to the axis of pivoting 4 of the backrest, the link rod 10 itself being mounted so that it can pivot on the support 9 about a second axis 12 parallel to the axis 11.

By virtue of these provisions, as represented in FIG. 10, when the adjustment mechanism 50 is actuated to incline the backrest of the seat backward, a very amplified displacement of the backrest and an associated downward displacement of the rear part of the seat cushion are obtained, so that the whole seat may find itself almost in a horizontal position, as represented in FIG. 10.

The link rod 10 supporting the front part of the seat cushion flange 20 could possibly be dispensed with and replaced in particular by:

- a sliding method of mounting the axis 11 on the support 9, for example with horizontal sliding,
- a sliding method of mounting the pin 62 on the support 7, for example with horizontal sliding,
- or some other freedom of movement allowing the distance between the axes 11 and 63 to vary.

In all the embodiments of the seat according to the invention, the adjustment mechanism 50 associated with the arm 60 may be provided on Just one side or on both sides of the seat.

I claim:

1. A vehicle seat including a seat cushion and a backrest each equipped with a rigid framework, the backrest being mounted so that it can pivot with respect to the seat cushion about a horizontal axis of pivoting, the pivoting of the backrest being controlled by an adjustment mechanism which includes a rotary input member, a support member fixed to one of the two frameworks, termed first framework, and a rotary output member driving the other of the two frameworks, termed second framework, this output member having an axis of rotation parallel to the axis of pivoting of the backrest, wherein the axis of rotation of the output member of the adjustment mechanism is offset with respect to the axis of pivoting of the backrest, the output member driving the second framework via a linkage member which is mounted so that it can slide at least radially with respect to an axis chosen from the axis of pivoting of the backrest and the axis of rotation of the output member, the linkage member furthermore being mounted so that it can pivot about an axis parallel to the axis of pivoting of the backrest, the pivoting of the linkage member taking place with respect to either the output member or the second framework, the axis of pivoting of the linkage member being separated from the axis of rotation of the output member by a first distance, and the axis of pivoting of the linkage member being separated from the axis of pivoting of the backrest by a second distance which is greater than the first distance.

2. The vehicle seat as claimed in claim 1, wherein the second distance is between 1.5 and 2.5 times the first distance.

3. The vehicle seat as claimed in claim 1, wherein the two frameworks respectively comprise two mutually parallel flanges between which the adjustment mechanism is arranged, the flange of the second framework having an opening through which the input member of the adjustment mechanism passes with enough clearance to prevent any interference between said input member and the flange of the second framework during relative pivoting of the two frameworks.

4. The vehicle seat as claimed in claim 1, wherein the linkage member includes a pin which extends along the axis of pivoting of the linkage member and which is integral with the output member of the adjustment mechanism, the second framework including a slot which is arranged longitudinally and radially with respect to the axis of pivoting of the backrest and which receives the pin, it being possible for this pin to slide along said slot and also to rotate in this slot.

5. The vehicle seat as claimed in claim 1, further including a seatbelt which has at least one upper linkage point at the top of the backrest.

6. The vehicle seat as claimed in claim 5, wherein the seatbelt further includes two lower anchoring points, the framework of the backrest having, at least on one side of the seat, an appendage which extends substantially downward and substantially in the extension of the backrest beyond the axis of pivoting of the backrest, at least one of the lower anchoring points of the belt being fixed to this appendage.

7. The vehicle seat as claimed in claim 1, wherein the support member of the adjustment mechanism is mounted so that it can rotate about an axis termed axis of tipping parallel to the axis of pivoting of the backrest, the axis of pivoting of the backrest being embodied by a pivot which is integral with the support member of the adjustment mechanism at least as far as rotation about the axis of tipping is concerned, it being possible for the support member of the adjustment mechanism to be immobilized in terms of rotation about the axis of tipping by means of a locking bolt, in a predetermined angular position which corresponds to the backrest being in an up position, it being possible to actuate this locking bolt to unblock the rotation of the support member about the axis of tipping, thus allowing the backrest of the seat to be tipped forward.

8. The vehicle seat as claimed in claim 7, wherein the pivot is integral with the second framework and has a pin of circular cross section which extends toward the first framework, the first framework having a slot which has the shape of an arc of a circle centered on the axis of tipping and which receives said pin, and the support member of the adjustment mechanism being integral with a rigid plate substantially perpendicular to the axis of tipping, this plate having a peripheral edge which has a first notch interacting with the locking bolt to immobilize the support member of the adjustment mechanism, and a second notch which receives the pin of the axis of pivoting of the backrest in order to drive this pin in rotation about the axis of tipping.

9. The vehicle seat as claimed in claim 1, wherein the framework of the seat cushion is supported by a support device independent of the adjustment mechanism and of the linkage member.

10. The vehicle seat as claimed in claim 1, wherein the linkage member is mounted so that it can pivot about its aforementioned axis of pivoting with respect to a first support, the framework of the seat cushion being supported toward the rear at least by this first support and furthermore being supported toward the front at least by a second support with respect to which it can pivot about at least one axis parallel to the axis of pivoting of the backrest, actuation of the adjustment mechanism leading simultaneously to a pivoting of the backrest of the seat and to a vertical displacement of a rear part of the seat cushion.

11. The vehicle seat as claimed in claim 10, wherein the way in which the linkage member is mounted on the first support and the way in which the framework of the seat cushion is mounted on the second support allows the linkage member and the axis of pivoting of the framework of the seat cushion with respect to the second support to move closer together or further apart.

* * * * *